United States Patent
Inoue et al.

(10) Patent No.: US 10,905,046 B2
(45) Date of Patent: Feb. 2, 2021

(54) COMBINE

(71) Applicant: Kubota Corporation, Osaka-shi (JP)

(72) Inventors: Hirotsugu Inoue, Sakai (JP); Kazuhiro Takahara, Sakai (JP); Hiroshi Ikeda, Sakai (JP)

(73) Assignee: Kubota Corporation, Osaka (JP)

( * ) Notice: Subject to any disclaimer, the term of this patent is extended or adjusted under 35 U.S.C. 154(b) by 48 days.

(21) Appl. No.: 16/094,275

(22) PCT Filed: May 15, 2017

(86) PCT No.: PCT/JP2017/018158
§ 371 (c)(1),
(2) Date: Oct. 17, 2018

(87) PCT Pub. No.: WO2018/003321
PCT Pub. Date: Jan. 4, 2018

(65) Prior Publication Data
US 2019/0327891 A1    Oct. 31, 2019

(30) Foreign Application Priority Data
Jun. 27, 2016   (JP) .................................. 2016-126879

(51) Int. Cl.
*A01D 41/127*   (2006.01)
*A01F 12/60*    (2006.01)
(Continued)

(52) U.S. Cl.
CPC ....... *A01D 41/1275* (2013.01); *A01D 34/006* (2013.01); *A01D 41/1208* (2013.01);
(Continued)

(58) Field of Classification Search
USPC ............................................. 701/50
See application file for complete search history.

(56) References Cited

U.S. PATENT DOCUMENTS

| 5,712,782 A | 1/1998 | Weigelt et al. |
| 9,392,746 B2 * | 7/2016 | Darr ............ A01D 43/087 |

(Continued)

FOREIGN PATENT DOCUMENTS

| EP | 2902957 A1 | 8/2015 |
| JP | 2005224222 A | 8/2005 |

(Continued)

*Primary Examiner* — Tyler D Paige
(74) *Attorney, Agent, or Firm* — The Webb Law Firm (57) ABSTRACT

Provided is a combine capable of harvesting an appropriate amount of grains according to a free capacity of a drier, while reducing trouble for a worker. A harvest amount sensor is capable of a first determination U1 for determining the grain storage amount intermittently during reaping traveling of a traveling vehicle body and a second determination U2 for determining the grain storage amount based on a manual operation during stopped state of the traveling vehicle body. A calculation section is configured to calculate the total harvest amount based on a first determination amount M1 by the first determination U1 and a second determination amount M2 by the second determination U2. A decision section is provided for deciding whether the total harvest amount has exceeded the target storage amount MI based on a requested grain amount requested by a drier, or not. An informing section is provided for effecting completion informing T3 if the decision section decides that the total harvest amount has exceeded the target storage amount MI.

4 Claims, 7 Drawing Sheets

(51) Int. Cl.
*G06Q 50/02* (2012.01)
*A01D 34/00* (2006.01)
*A01D 41/12* (2006.01)
*A01D 41/133* (2006.01)

(52) U.S. Cl.
CPC ............ *A01D 41/133* (2013.01); *A01F 12/60* (2013.01); *G06Q 50/02* (2013.01)

(56) References Cited

U.S. PATENT DOCUMENTS

| | | | | |
|---|---|---|---|---|
| 10,143,134 | B2* | 12/2018 | Takahara | A01D 41/133 |
| 2002/0194551 | A1* | 12/2002 | Mueller | F02D 41/2493 |
| | | | | 714/48 |
| 2003/0080753 | A1* | 5/2003 | Rains | A01D 41/1208 |
| | | | | 324/643 |
| 2012/0200697 | A1* | 8/2012 | Wuestefeld | G01F 1/00 |
| | | | | 348/137 |
| 2012/0302299 | A1* | 11/2012 | Behnke | A01B 69/008 |
| | | | | 460/6 |
| 2013/0211675 | A1* | 8/2013 | Bonefas | B62D 12/02 |
| | | | | 701/41 |
| 2014/0039719 | A1* | 2/2014 | Morselli | G08G 99/00 |
| | | | | 701/1 |
| 2015/0330792 | A1* | 11/2015 | Stahlin | G01C 21/16 |
| | | | | 701/479 |
| 2016/0029559 | A1 | 2/2016 | Inoue et al. | |
| 2016/0057929 | A1* | 3/2016 | Takahara | A01D 41/133 |
| | | | | 701/50 |
| 2017/0112062 | A1* | 4/2017 | Holt, II | A01D 41/1275 |
| 2017/0115211 | A1* | 4/2017 | Morimoto | G01N 33/10 |
| 2017/0311544 | A1* | 11/2017 | Ikeda | A01F 12/46 |
| 2019/0166761 | A1* | 6/2019 | Conrad | A01D 41/1275 |
| 2019/0183046 | A1* | 6/2019 | Ueda | A01D 41/1208 |
| 2019/0327891 | A1* | 10/2019 | Inoue | A01D 41/133 |

FOREIGN PATENT DOCUMENTS

| | | |
|---|---|---|
| JP | 2013118858 A | 6/2013 |
| JP | 2014187908 A | 10/2014 |
| JP | 2014187943 A | 10/2014 |
| JP | 2015177749 A | 10/2015 |
| JP | 2015177750 A | 10/2015 |
| KR | 1020150109242 A | 10/2015 |

* cited by examiner

COMBINE

CROSS-REFERENCE TO RELATED APPLICATIONS

This application is the United States national phase of International Application No. PCT/JP2017/018158 filed May 15, 2017, and claims priority to Japanese Patent Application No. 2016-126879 filed Jun. 27, 2016, the disclosures of which are hereby incorporated in their entirety by reference.

TECHNICAL FIELD

The present invention relates to a combine having a harvest amount sensor capable of determining a grain storage amount of grains stored in a grain storage section.

BACKGROUND ART

A conventional combine is disclosed in Patent Document 1 for example. With this combine, in the course of a reaping traveling of a traveling vehicle body, if it is decided that a set amount of grains has been stored in the grain storage section (described as a "grain tank" in the document) based on determination by the harvest amount sensor (described as a "load cell" in the document), informing of this to a worker is done. This set amount is set as an amount less than a full capacity of the gain storage section and is manually set by the worker in accordance with e.g. a free (or spare) capacity of a drier.

BACKGROUND ART DOCUMENT

Patent Document

Patent Document 1: Japanese Unexamined Patent Application Publication No. 2013-118858

SUMMARY

Problem to be Solved by Invention

With the above-described conventional art, however, when the worker manually sets the set amount, there would occur a trouble of the worker's having to refer to and check the free capacity of the drier. Further, in case there is a large free amount in the drier and it is needed to effect a harvesting operation and a discharging operation of grains in repetition by the combine, manual change of the set amount by the worker would be sometimes required. Thus, there would occur significant trouble for the worker.

Further, according to the above-described conventional art, when a total harvest amount of grains corresponding to the free capacity of the drier is to be calculated based on determination result by the harvest amount sensor, if such total harvest amount is obtained by summing up determination results acquired during a reaping traveling exposed to significant external disturbances such as vibration, there would be possibility of significant deviation of the actual harvest amount of grains from the calculated total harvest amount.

In view of the above-described state of the art, there is a need for providing a combine capable of harvesting an appropriate amount of grains according to a free capacity of a drier, while reducing trouble for a worker.

Solution

A combine according to the present invention comprises:
a harvest amount sensor capable of determining a grain storage amount of grains stored in a grain storage section;
a communication section capable of communication with an external drier;
a setting section capable of setting a target storage amount based on a requested grain amount requested by the drier; and
a calculation section for calculating a total harvest amount based on the grain storage amount determined by the harvest amount sensor;
the harvest amount sensor being capable of a first determination for determining the grain storage amount intermittently during reaping traveling of a traveling vehicle body and a second determination for determining the grain storage amount based on a manual operation during stopped state of the traveling vehicle body;
the calculation section being configured to calculate the total harvest amount based on a first determination amount by the first determination and a second determination amount by the second determination;
wherein a decision section is provided for deciding whether the total harvest amount has exceeded the target storage amount or not; and
an informing section is provided for effecting completion informing if the decision section decides that the total harvest amount has exceeded the target storage amount.

According to the present invention described above, when a requested grain amount requested by the drier according to its free capacity is received via the communication section, a target storage amount is set automatically based on this received requested grain amount. A total harvest amount is calculated automatically based on the grain storage amount determined by the harvest amount sensor, and when this calculated total harvest amount exceeds the target storage amount, completion informing is effected, whereby the worker can readily recognize the entire harvesting work has been completed. Thus, the trouble of manual setting, etc. can be eliminated, so that the trouble for the worker can be reduced.

Here, such set target storage amount may either exceed the full capacity of the grain storage section or fall short of this full capacity.

For instance, if the target storage amount exceeds the full capacity of the grain storage section, firstly, a harvesting work will be carried out until the grain storage section becomes full (or nearly full), and then the traveling vehicle body will be rendered into a stopped state for effecting the second determination manually under a condition with less external disturbance such as vibration and then a discharging operation of grains will be carried out. If the sum total value of the second determination amount by this second determination and the full capacity of the grain storage section is below the target storage amount, then the same operations as above will be carried out again. And, such harvesting operation and discharging operation will be carried out in repetition until the sum total value of one or more second determination amounts and the full storage amount of the grain storage section exceeds the target storage amount. When the sum total value of one or more second determination amounts and the full storage amount of the grain storage section exceeds the target storage amount, then, the first determination will be effected for intermittently determining the grain storage amount with reaping traveling of the traveling vehicle body. And, when the total harvest amount which is a sum total value of one or more second determination amounts and the first determination amount which varies in real time exceeds the target storage amount, completion informing will be effected to the worker. With this, the entire harvesting work can be completed with accuracy harvesting of the target storage amount of grains.

Further, for instance, if the target storage amount falls short of the full capacity of the grain storage section, the first determination for intermittently determining the grain storage amount with reaping traveling of the traveling vehicle body will be effected from the beginning. And, then, when the total harvest amount which is the first determination amount in this case exceeds the target storage amount, completion informing will be effected to the worker.

In this way, the total harvest amount is calculated based on the first determination amount by the first determination and the second determination amount by the second determination. In this, in case the target storage amount set based on a requested grain amount from the drier is large, the second determination amount which has higher accuracy than the first determination amount is employed in addition to the first determination amount in the calculation of the total harvest amount corresponding to the target storage amount, so the possibility of deviation of the actual harvest amount of grains from the target storage amount is reduced. Consequently, an appropriate amount of grains can be harvested with less excess or shortage according to a free capacity of the drier.

In this way, according to the present invention, it is possible to harvest an appropriate amount of grains according to a free capacity of a drier, while reducing trouble for a worker.

Preferably, in the present invention:

the setting section can set a preliminary target amount which is less than the target storage amount;

a preliminary informing different from the completion informing is effected when the total harvest amount exceeds the preliminary target amount.

With the above-described arrangement, by the preliminary informing, the worker can readily grasp that completion of the entire harvesting work is now imminent. So, the predictability of the work can be enhanced.

Preferably, in the present invention:

informing different from both the completion information and the preliminary informing is effected if a grain culm sensor for detecting grain culm at a reaping section becomes non-detection state when the total harvest amount is present between the target storage amount and the preliminary target amount.

With the above-described arrangement, if the grain culm sensor becomes non-detection state at a stage when the total harvest amount is to soon reach the target storage amount and it is thus found that the traveling vehicle body has traveled through a reaping path within the field, it is possible to prompt the worker to stop the harvesting work rather than advancing into a next reaping path. With this, it becomes easy to avoid excessive harvesting of grains over the free capacity of the drier.

Preferably, in the present invention:

the combine further comprises:

a reaping clutch for engaging/disengaging power transmission to the reaping section; and a threshing clutch for engaging/disengaging power transmission to a threshing device; and wherein the reaping clutch and the threshing clutch are brought into disengaging state respectively if the grain culm sensor for detecting grain culm at the reaping section becomes the non-detection state when the total harvest amount is present between the target storage amount and the preliminary target amount.

With the above-described arrangement, if the grain culm sensor becomes non-detection state at a stage when the total harvest amount is to soon reach the target storage amount and it is thus found that the traveling vehicle body has traveled through a reaping path within the field, the reaping clutch and the threshing clutch are brought into disengaging state respectively, thereby to inhibit the vehicle's advancing into the next reaping path, so that the harvesting work can be suspended forcibly. With this, it becomes easy to avoid excessive harvesting of grains over the free capacity of the drier.

EMBODIMENTS

[General Configuration of Combine]

In the following explanation, a mark F denotes "front", a mark B denotes "rear" (or "back"), a mark L denotes "left" and a mark R denotes "right", respectively, as all shown in FIG. 2.

Figure 1:
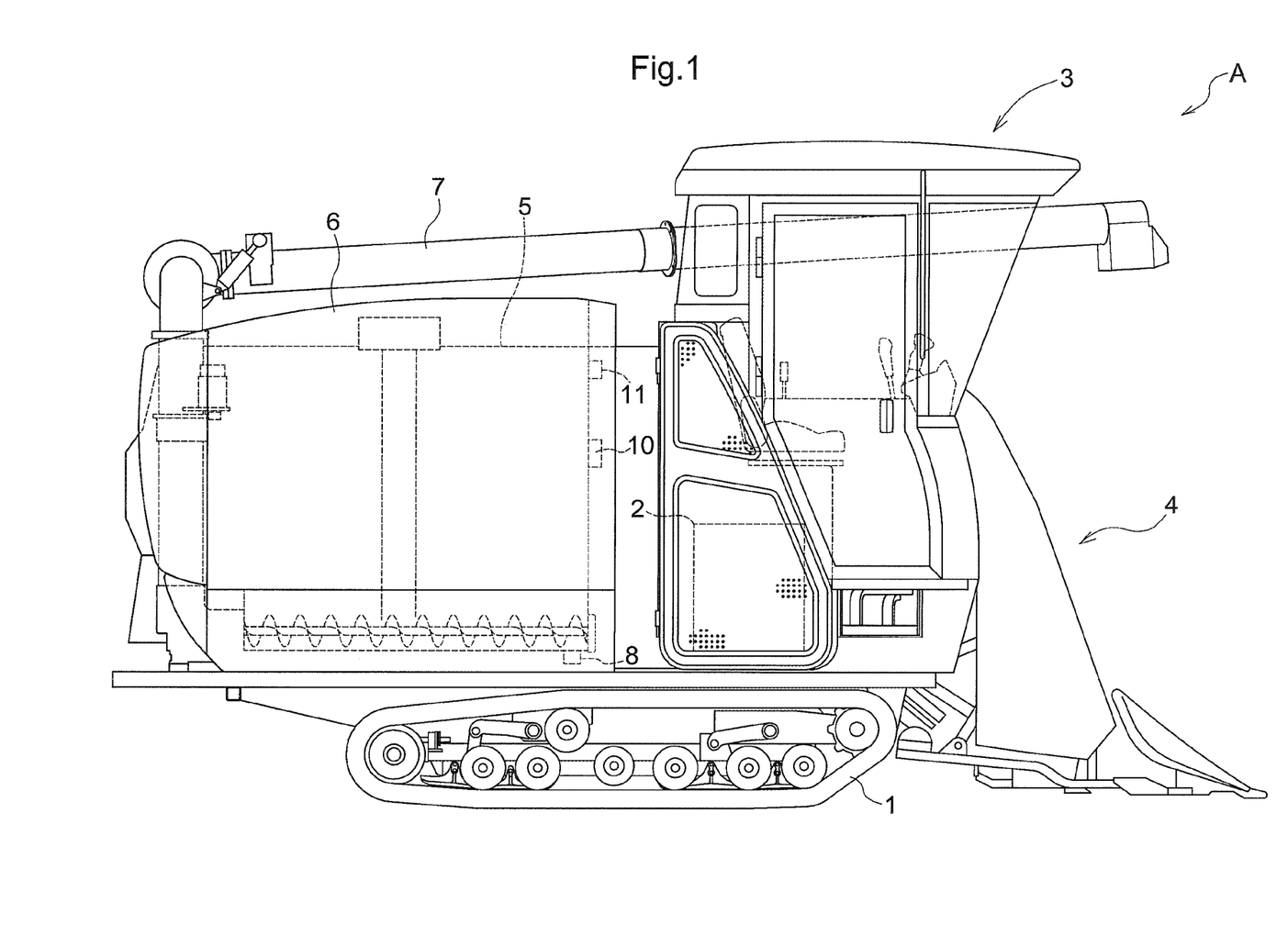
FIG. 1 is an overall side view of a combine.
Figure 2:
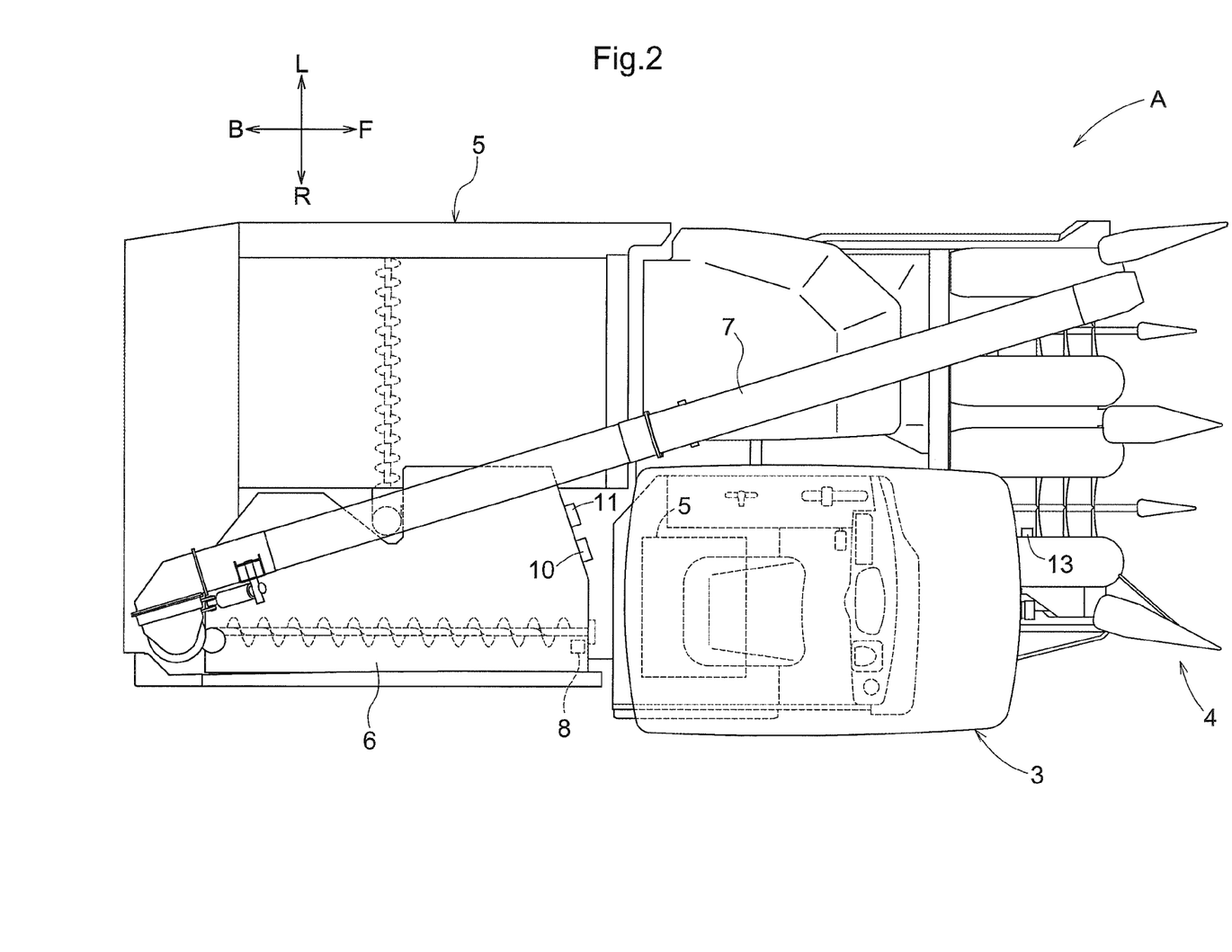
FIG. 2 is an overall plan view of the combine.

As shown in FIG. 1 and FIG. 2, a combine A includes a traveling vehicle body which can be self-propelled by means of a pair of left and right crawler traveling devices 1. The traveling vehicle body mounts an engine 2 as a power source, a driving section 3 where a worker effects a driving operation, a reaping section 4 for reaping planted grain culms while the traveling vehicle body is caused to travel, a threshing device 5 for threshing cut grain culms, a grain tank 6 (an example of a "grain storage section") for storing grains produced by a threshing operation at the threshing device 5, and an unloader 7 capable of discharging grains inside the grain tank 6 to the outside, and so on. This combine A is configured as a self-threshing type for threshing only heads of the cut grain culms at the threshing device 5.

Figure 4:
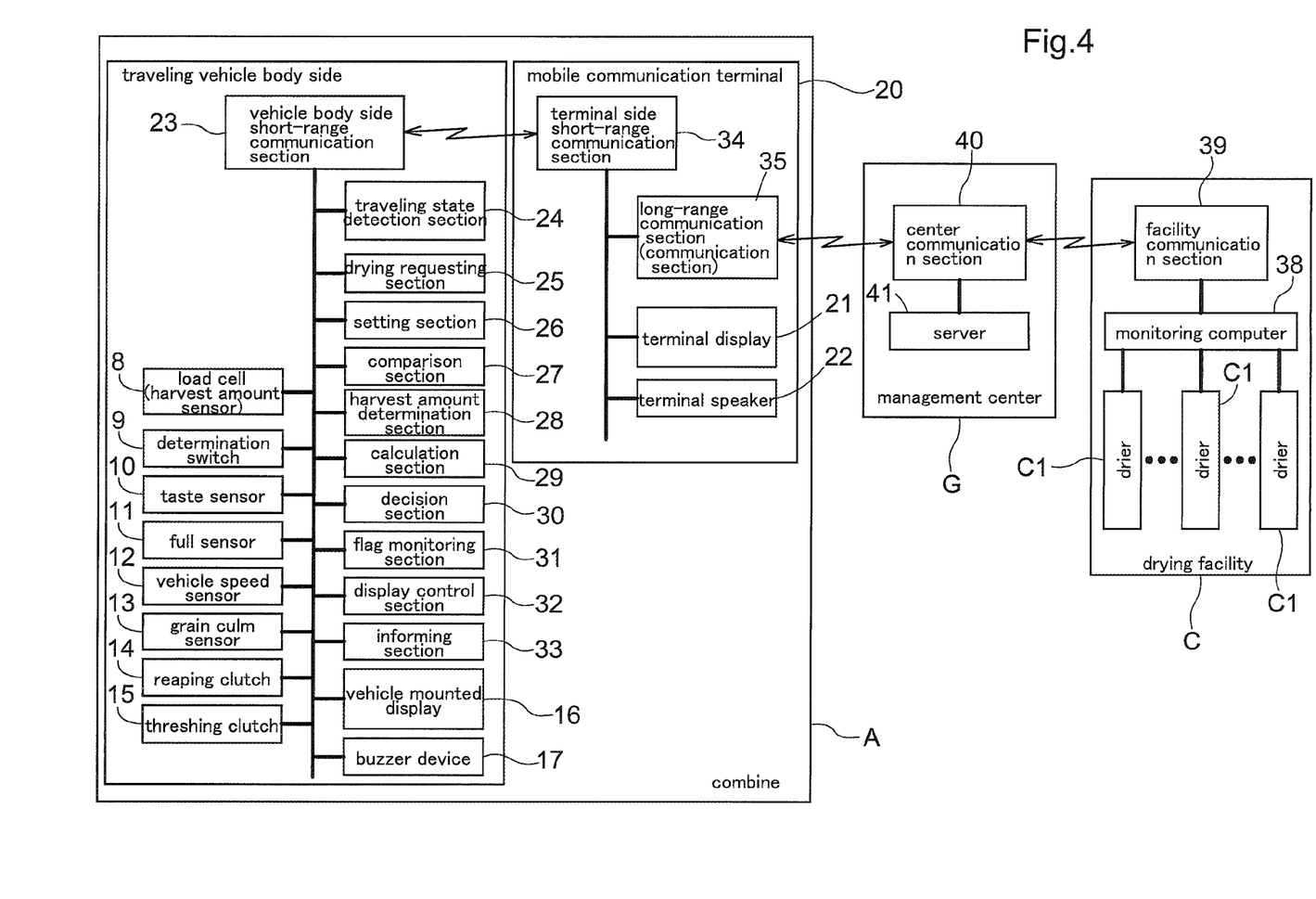
FIG. 4 is a block diagram showing one specific example of the harvest management system.

As shown in FIG. 1, FIG. 2 and FIG. 4, the combine A further includes a load cell 8 (an example of a "harvest amount sensor") capable of determining a grain storage amount of grains stored in the grain tank 6. This load cell 8 is configured to be capable of weight determination. The combine A also includes a determination switch 9 manually operable for commanding execution of a determination by the load cell 8.

Further, as shown in FIG. 1, FIG. 2 and FIG. 4, the combine A includes a taste sensor 10 capable of determining quality data of grains charged into the grain tank 6. Such quality data include data relating to a moisture value of grains, a protein value of grains, etc. Namely, this taste sensor 10 can be used as a moisture sensor for detecting a moisture value of grains stored in the grain tank 6. The combine A further includes a full sensor 11 configured as a level sensor for detecting grains stored inside the grain tank 6 reaching the full capacity of the tank. This full sensor 11 is configured to detect "full" state of the grain tank 6 when the amount of stored grains becomes an amount slightly less than the full state which is the physical limit storable in the grain tank 6. The combine A includes a vehicle speed sensor 12 for detecting a vehicle speed of the traveling vehicle body. The combine A further includes a grain culm sensor 13 for detecting culms at the reaping section 4.

Further, as shown in FIG. 4, the combine A includes a reaping clutch 14 for engaging/disengaging power transmission from the engine 2 to the reaping section 4. The combine A further includes a threshing clutch 15 for engaging/disengaging power transmission from the engine 2 to the threshing device 5.

Further, as shown in FIG. 4, the traveling vehicle body of the combine A mounts a vehicle-mounted display 16 capable of visually informing information, a buzzer device 17 capable of informing information as a sound, etc.

[Harvest Management System]

Figure 3:
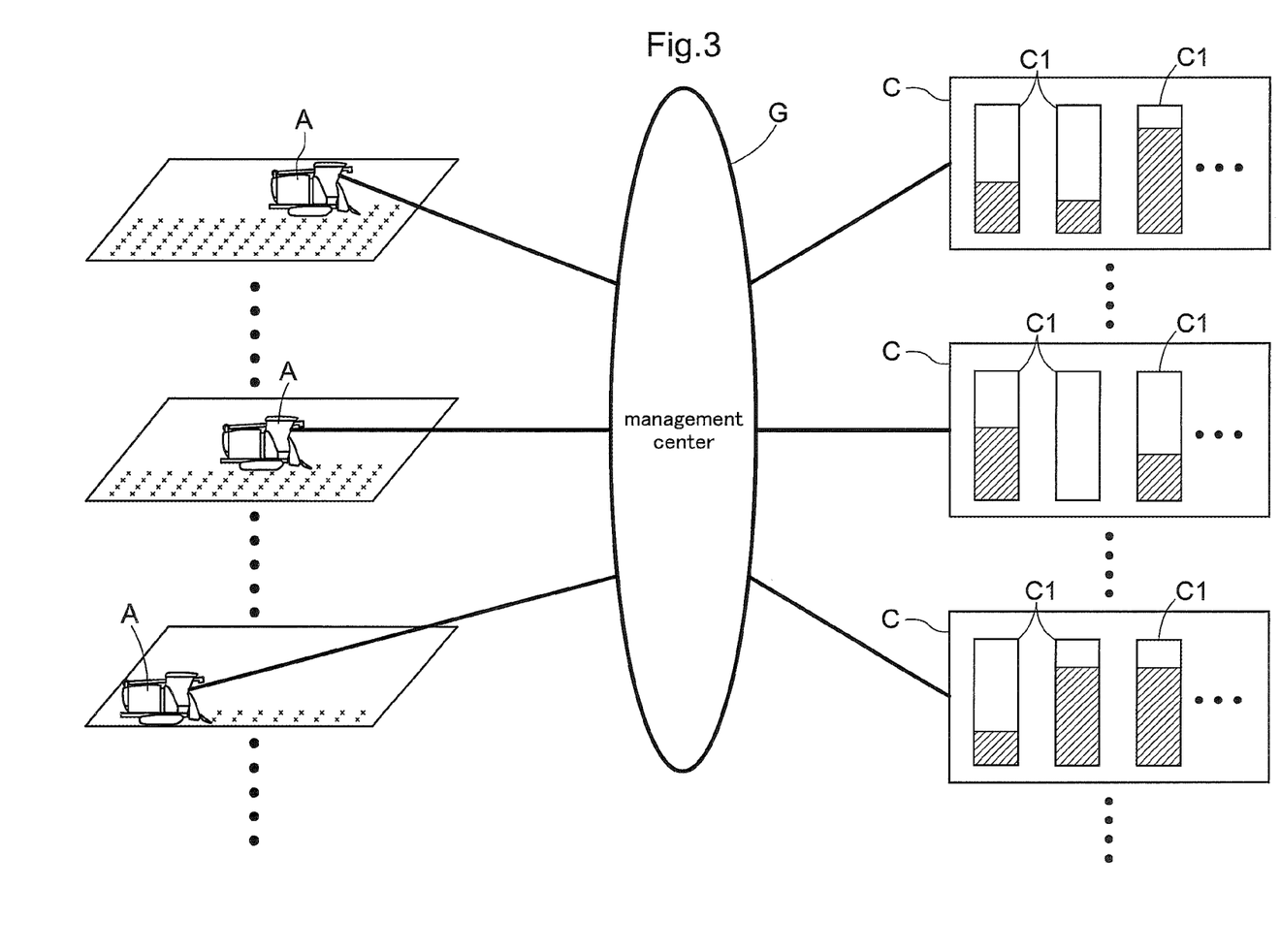
FIG. 3 is a diagram showing an overall configuration of a harvest management system.

As shown in FIG. 3, the harvest management system is configured of a plurality of combines A for carrying out harvesting works for grains, a management center G for collecting and managing information, and a plurality of drying facilities C for carrying out drying operations of harvested grains. Each drying facility C includes a plurality of driers C1 to which drying conditions therefor can be set individually and respectively.

[Control System of Combine]

As shown in FIG. 4, the control system of the combine A incorporates a mobile communication terminal 20 configured as a portable computer capable of communication with the outside via a communication network such as a public LAN, a mobile phone network, the internet, etc. As such mobile communication terminal 20, it is possible to employ various kinds of terminals such as a smart phone, a tablet terminal, a laptop personal computer, etc. The mobile communication terminal 20 includes a terminal display 21 capable of visually displaying information, a terminal speaker 22 capable of outputting sound, etc.

The control system of the combine A includes, on the traveling body side, a vehicle body side short-range communication section 23, a traveling state detection section 24, a drying requesting section 25, a setting section 26, a comparison section 27, a harvest amount determination section 28, a calculation section 29, a decision section 30, a flag monitoring section 31, a display control section 32, an informing section 33, and so on. These functional sections are incorporated in the control device constituted of a computer. The load cell 8, the determination switch 9, the taste sensor 10, the full sensor 11, the vehicle speed sensor 12, the grain culm sensor 13, the reaping clutch 14, the threshing clutch 15, the vehicle body side short-range communication section 23, the traveling state detection section 24, the drying requesting section 25, the setting section 26, the comparison section 27, the harvest amount determination section 28, the calculation section 29, the decision section 30, the flag monitoring section 31, the display control section 32, the informing section 33, the vehicle mounted display 16, and the buzzer device 17 are bus-connected by using CAN communication via a vehicle-mounted LAN to be capable of data exchange.

Further, as shown in FIG. 4, the control system of the combine A includes, on the side of the mobile communication terminal 20, a terminal side short-range communication section 34, a long-range communication section 35 (corresponding to the "communication section"), and so on. The terminal side short-range communication section 34, the long-range communication section 35, the terminal display 21 and the terminal speaker 22 are bus-connected to be capable of data exchange.

The vehicle body side short-range communication section 23, the terminal side short-range communication section 34 of the mobile communication terminal 20 all shown in FIG. 4 are connected to be capable of data exchange with using a short-range wireless communication, a wired connection, etc. As a communication standard for such short-range wireless communication, the Wi-Fi, the Bluetooth (registered trademark), etc. can be employed.

The combine A is configured to be capable of communication with the external driers C1 via the management center G by the long-range communication section 35 of the mobile communication terminal 20.

The traveling state detection section 24 shown in FIG. 4 is configured to detect a reaping traveling state or a non-reaping traveling state, based on of the state of the grain culm sensor 13, the state of the threshing clutch 15 and the detection result of the vehicle speed sensor 12. For instance, when the grain culm sensor 13 is under the detection state AND the threshing clutch 15 is under the engaging state AND the vehicle speed detected by the vehicle speed sensor 12 is greater than zero, then, the traveling state detection section 24 detects this as a reaping traveling state and detects the non-reaping traveling state otherwise.

The drying requesting section 25 shown in FIG. 4, at time of start of first reaping operation, obtains data of a moisture value of grains of the field detected by the taste sensor 10 and transmits this moisture value data to the management center G and requests the management center G to select a drier C1 as a receiving destination, and also to transmit a requested grain amount of such drier C1.

The setting section 26 shown in FIG. 4 can set a target storage amount MI based on the requested grain amount requested by the drier C1. Further, the setting section 26 can set also a preliminary target amount MP which is smaller than the target storage amount MI (see FIG. 5 and FIG. 6).

The comparison section 27 shown in FIG. 4 compares the target storage amount MI obtained from the requested grain amount of one or more of driers C1 and a full capacity MF of grains in the grain tank 6 and determines whether the target storage amount MI exceeds the full capacity MF or not.

The harvest amount determination section 28 shown in FIG. 4 is configured to be capable of a first determination U1 for determining intermittently a grain storage amount stored in the grain tank 6 while the traveling vehicle body is reaping traveling (determining in real time). Further, the harvest amount determination section 28, aside from the first determination U1, is capable also of a second determination U2 for determining a grain storage amount in response to a manual operation on the determination switch 9 under a stopped state of the traveling vehicle body (see FIG. 5 and FIG. 6).

The calculation section 29 shown in FIG. 4 is configured to calculate a total harvest amount based on the grain storage amount determined by the load cell 8. More particularly, the calculation section 29 is configured to calculate such total harvest amount based on the first determination amount M1 by the first determination U1 and the second determination amount M2 by the second determination U2 (see FIG. 5 and FIG. 6).

The decision section 30 shown in FIG. 4 decides whether the total harvest amount calculated by the calculation section 29 exceeds the target storage amount MI or not. Further, the decision section 30 decides also whether the total harvest amount calculated by the calculation section 29 exceeds the preliminary target amount MP or not. The preliminary target amount MP is smaller than the target storage amount MI.

The flag monitoring section 31 shown in FIG. 4 is configured to monitor an inhibition flag for inhibiting the second determination U2. Such inhibition flag will be described later herein.

The display control section 32 shown in FIG. 4 is configured to be capable of displaying information on the vehicle mounted display 16 or the terminal display 21. The display control section 32 causes, during reaping traveling, real-time displaying of the first determination amount M1 by the first determination U1 on the vehicle mounted display 16 or the terminal display 21.

The informing section 33 shown in FIG. 4 is configured to be capable of effecting various informing operations via the terminal display 21, the terminal speaker 22, the vehicle mounted display 16, the buzzer device 17, etc. As examples of such various kinds of informing operations, a full informing T1, a preliminary informing T2, a completion informing T3, an entry warning informing T4, etc. can be cited.

Figure 5:
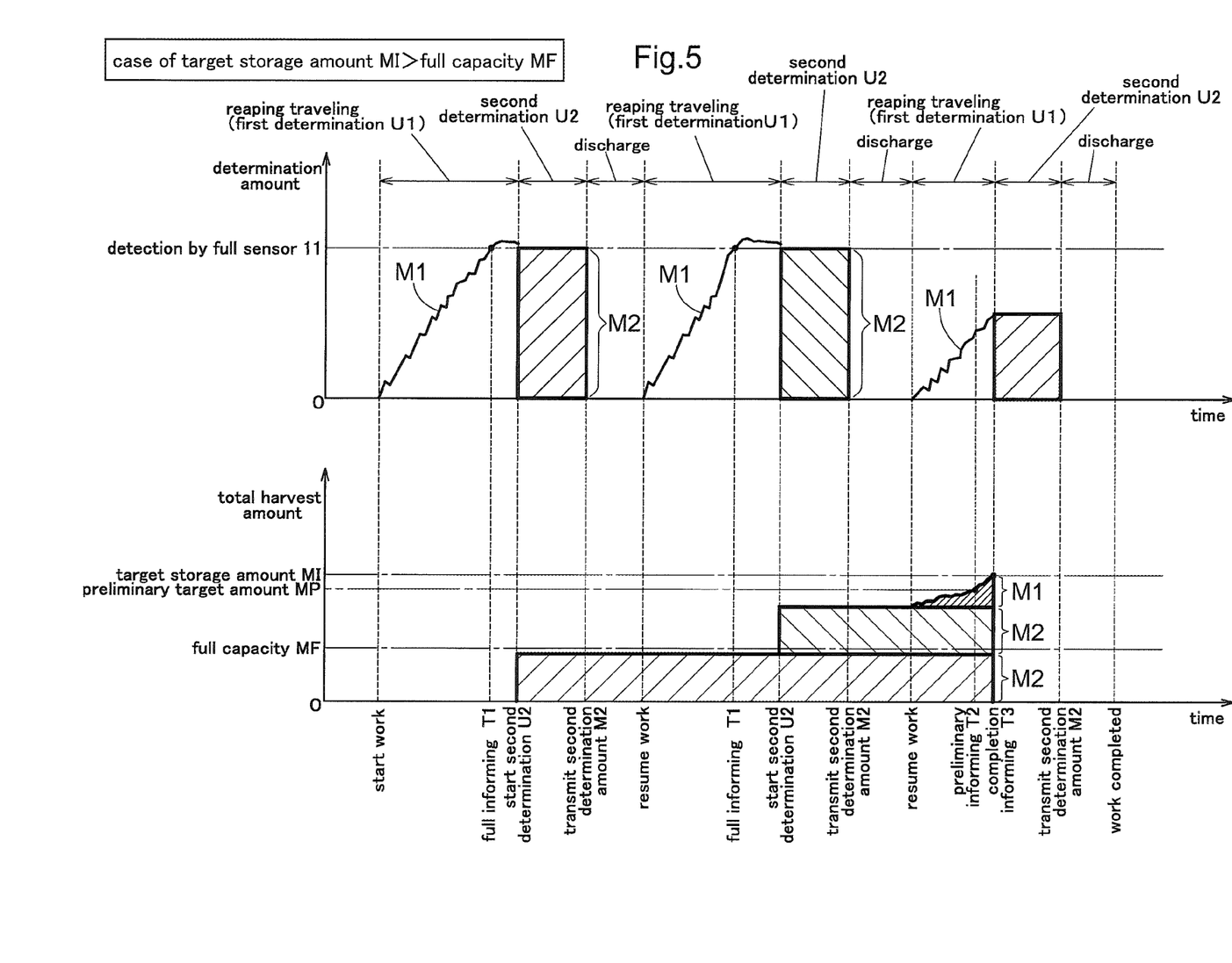
FIG. 5 is a chart for explaining a method of calculating a total harvest amount in case a target storage amount exceeds a full capacity.

The informing section 33, as shown in FIG. 5, effects the full informing T1 in response to input of information indicating the grain tank 6 becoming full based on detection result of the full sensor 11. Further, the informing section 33 effects the preliminary informing T2 different from the full informing T1 and the completion informing T3, when the total harvest amount exceeds the preliminary target amount MP. The informing section 33 effects the completion informing T3 different from the full informing T1 and the preliminary informing T2 when the decision section 30 decides that the total harvest amount exceeds the target storage amount MI. Still further, the informing section 33 effects the entry warning informing T4 different from the full informing T1, the completion informing T3 and the preliminary informing T2, if the grain culm sensor 13 for detecting grain culms at the reaping section 4 becomes non-detection state when the total harvest amount is present between the target storage amount MI and the preliminary target amount MP (see FIG. 7).

The long-range communication section 35 shown in FIG. 4 is capable of data communication with the outside such as the management center G, via a communication network such as the internet.

[Drying Facilities]

Each drying facility C shown in FIG. 3 and FIG. 4 includes a monitoring computer 38 for effecting monitoring and controlling of the state of each drier C1, a facility communication section 39 connected to a center communication section 40 via a communication network such as the internet. The monitoring computer 38 is configured to monitor a drying condition such as a moisture value of grains suitable for charging each drier C1, a free (spare) capacity (requested grain amount) of the drier C1, etc. Also, the monitoring computer 38 is configured to transmit the requested grain amount of the selected drier C1 via the facility communication section 39 in response to a request from the management center G.

[Management Center]

The management center G shown in FIG. 3 and FIG. 4 includes the center communication section 40 having the function of communicating with the outside, and a server 41 for effecting various kinds of information processing. The server 41 is configured as a cloud server, for instance. The server 41 is capable of transmitting/receiving data via the center communication section 40, to/from the long-range communication section 35 of each combine A, the facility communication section 39 of each drying facility C. The server 41 stores therein, for each combine A, information of actual harvest amount of grains transmitted from the combine A with updating thereof when needed. Further, the server 41 stores also therein moisture value and the free capacity (requested grain amount) of each drier C1 with updating thereof when needed transmitted from each drying facility C.

[Example of Procedure of Harvesting Work]

The server 41 shown in FIG. 4 receives information of the moisture value of grains and the current free capacity assigned to each drier C1 by the monitoring computer 38 of each drying facility C with updating when needed and stores such information with the updates thereof.

When the combine A shown in FIG. 1 and FIG. 2, etc. started its work and has effected reaping traveling by a predetermined distance, the drying requesting section 25 will request data of the moisture value of grains harvested in the field based on the detection result of the taste sensor 10. Next, the drying requesting section 25 of the combine A will transmit such moisture value data to the management center G and request transmission therefrom information relating to the drier C1 as the receiving destination.

The server 41 of the management center G will select a drier C1 for drying the grains having a moisture value suitable for such moisture value from the moisture value data received from the combine A and will assign the selected drier C1 to the combine A and stores this assignment. In this case, the number of the drier C1 to be assigned to one combine A can be one or a plurality. In this way, the management center G will assign the free capacity (requested grain amount) of the drier C1 of each drying facility C to each combine A, based on the moisture value of grains. And, the management center G will transmit the free capacity (requested grain amount) of the selected drier C1 to the combine A.

The combine A, by its setting section 26 shown in FIG. 4, sets the target storage amount MI in accordance with the requested grain amount of the drier C1 received from the management center G. In this, the setting section 26 will set also the preliminary target amount MP which is smaller than the target storage amount MI.

Here, in case the number of assigned driers C1 is one, the target storage amount MI to be set by the setting section 26 will be set to an amount which is equal to or slightly smaller than the requested grain amount of such drier C1. On the other hand, in case the number of assigned driers C1 is a plurality, the target storage amount MI will be set to an amount equal to or slightly smaller than the sum total value of requested grain amounts of such plurality of driers C1.

The combine A, by its comparison section 27 shown in FIG. 4, decides whether the set target storage amount MI exceeds the full capacity MF of the grain tank 6 or not.

[Case of Target Storage Amount Exceeding Full Capacity of Grain Tank]

As shown as one example in FIG. 5, in case the target storage amount MI exceeds the full capacity MF as the physical limit of storage by the grain tank 6, a plurality of rounds of harvesting operations and discharging operations will be needed. Firstly, when grains have been stored in the grain tank 6 to the installed (sensing) position of the full sensor 11, the full informing T1 will be effected by the informing section 33. Until the full informing T1 is effected, the first determination U1 will be effected and the first determination amount M1 by the first determination U1 will be displayed in real time on the vehicle mounted display 16 or the terminal display 21 by the display control section 32. However, the first determination amount M1 in this case will not be used in the calculation of the total harvest amount by the calculation section 29.

Upon implementation of the full informing T1 by the informing section 33, the worker will stop the harvesting work and operate the determination switch 9 for effecting the second determination U2. When the determination switch 9 is pressed, the lift mechanism of the left and right traveling devices 1 will be activated to place the bottom face of the grain tank 6 horizontal, and the unloader 7 will be automatically operated to its storing position. In this way, the second determination amount M2 which is the determination result of the second determination U2 which is effected with placing the traveling vehicle body under the stopped state with a fixed posture will have higher accuracy of the determination result than the first determination amount M1 which is the determination result of the first determination U1 subjected to significant external disturbances such as vibration by the reaping traveling. This second determination amount M2 will be transmitted to the management center G via the long-range communication section 35, etc. and will be stored in the server 41. After completion of the second determination U2, grains inside the grain tank 6 will be discharged by the unloader 7.

If the sum total value of the second determination amount M2 and the full capacity MF of the grain tank 6 still falls short of the target storage amount MI, two or more rounds of harvesting operations and discharging operations will be needed. Thus, as shown in FIG. 5, the harvesting work will be resumed and same operations as above will be effected again.

When the sum total value of one or more second determination amounts M2 and the full capacity MF of the grain tank 6 exceeds the target storage amount MI, the calculation section 29 obtains a sum total value of the total value cumulative, i.e. adding up, of one or more second determination amounts M2 and the first determination amount M1 as the total harvest amount. If the decision section 30 decides that the total harvest amount calculated by the calculation section 29 has exceeded the preliminary target amount MP, the preliminary informing T3 is effected by the informing section 33. Then, when the decision section 30 decides that the total harvest amount calculated by the calculation section 29 has exceeded the target storage amount MI, the completion informing T3 is effected by the informing section 33.

Upon confirming the completion informing T3, the worker will stop the harvesting work and stop the traveling vehicle body, whereby the entire harvesting work is completed. Then, by operating the determination switch 9, the second determination U2 is effected. The second determination amount M2 by this second determination U2 will be transmitted to the management center G and stored in the server 41. The server 41 will store a sum total value cumulative of these two or more second determination amounts M2 as the actual harvest amount of grains harvested by the combine A.

[Case of Target Storage Amount Falling Short of Full Capacity of Grain Tank]

Figure 6:
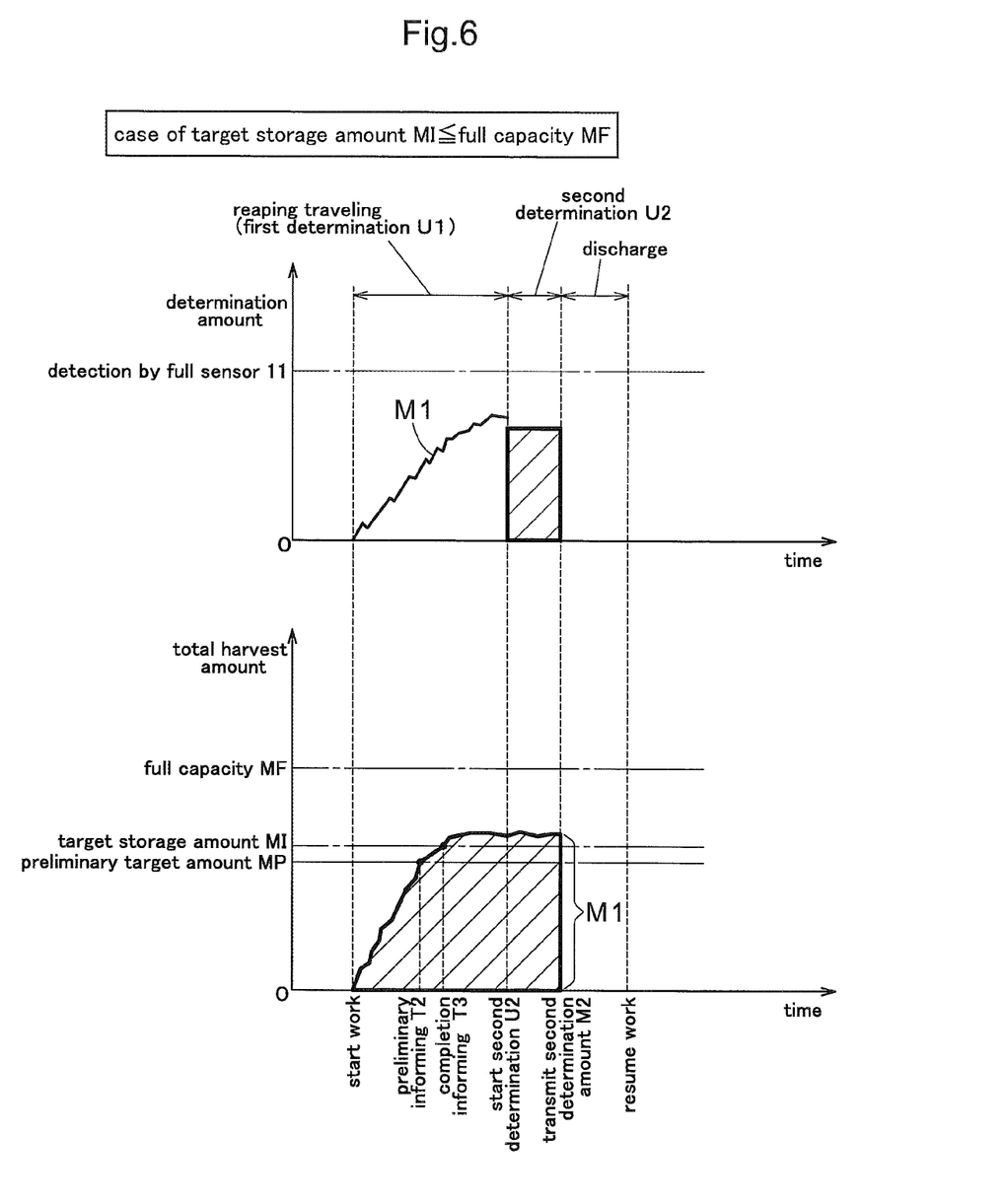
FIG. 6 is a chart for explaining a method of calculating a total harvest amount in case the target storage amount falls short of the full capacity.

As shown in FIG. 6, in case the target storage amount MI falls short of the full capacity MF of the grain tank 6, the entire harvesting work will be completed with one round of harvesting work alone. Whereas, in case the target storage amount MI exceeds the full capacity MF of the grain tank 6, in the the calculation section 29, the first determination amount M1 obtained by the first determination U1 as it is becomes the total harvest amount. If the decision section 30 decides that the total harvest amount calculated by the calculation section 29 has exceeded the preliminary target amount MP, the preliminary informing T2 is effected by the informing section 33. And, if the decision section 30 decides that the total harvest amount calculated by the calculation section 29 has exceeded the target storage amount MI, the completion informing T3 is effected by the informing section 33. Upon confirming the completion informing T3 by the informing section 33, the worker will stop the harvesting work and stop the traveling vehicle body. Then, by operating the determination switch 9, the second determination U2 is effected. In response to depression of the determination switch 9, the traveling vehicle body will be brought into a stopped state under a fixed posture. And, this second determination amount M2 will be transmitted to the management center G via e.g. the long-range communication section 35 and stored in the server 41. Upon completion of the second determination U2, grains in the grain tank 6 will be discharged by the unloader 7.

In this way, based on a moisture value of grains harvested in a field, a receiving destination drier C1 for the grains will be automatically selected and assigned to a combine A and upon arrival at a target storage amount MI corresponding to a free capacity (requested grain amount) of the drier C1, via the completion informing T3, completion of entire harvesting work will be informed to the worker. Thus, it is possible to reduce the worker's trouble of e.g. operating the combine A.

Moreover, in case the target storage amount MI exceeds the full capacity MF of the grain tank 6, the traveling vehicle body will be stopped and the second determination amounts M2 allowing acquisition of high accuracy determination result will be obtained in accumulation and then will be added up with the first determination amount M1 which is obtained in real time approximately, thus obtaining a total harvest amount to be compared with the target storage amount MI. With this arrangement, deviation of the actual grain harvest amount from the target storage amount MI can be suppressed, so that it becomes possible to avoid such inconvenience as harvesting grains by an amount exceeding the free capacity (requested grain amount) of the drier C1, for instance.

[Entry Warning Informing]

Figure 7:
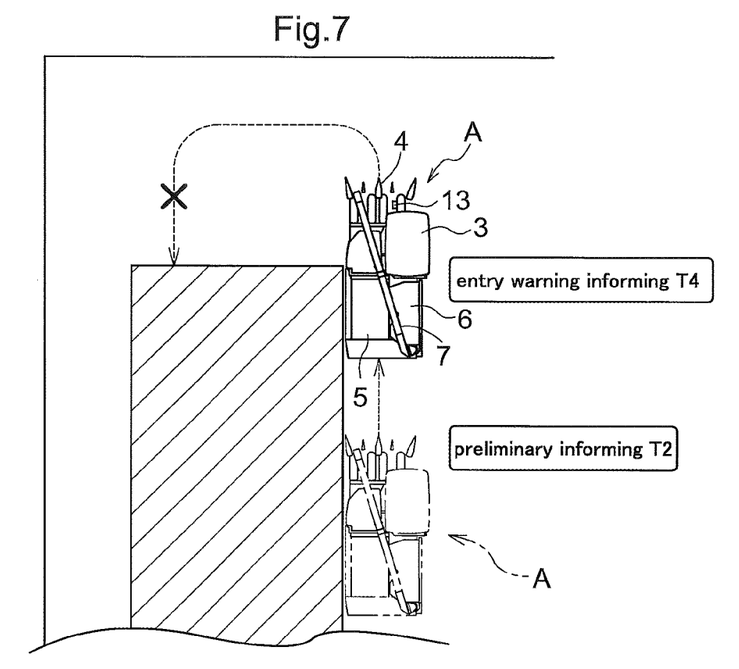
FIG. 7 is a diagram as seen in a plan view for explaining entry warning informing.

As shown in FIG. 7, in the course of reaping traveling of the combine A and when the total harvest amount calculated by the calculation section 29 is present between the target storage amount MI and the preliminary target amount MP, if the grain culm sensor 13 for detecting grain culms at the reaping section 4 becomes non-detection state, there will be effected the entry warning informing T4 which is different from all of the full informing T1, the preliminary informing T2 and the completion informing T3.

With the above-described arrangement, when the combine A traveled and cut through a reaping path of the field, if there remains only a small amount of grains until it reaches the target storage amount MI, the entry warning informing T4 will be effected for urging the worker not to enter or advance into the next reaping path, but to suspend the harvesting work. This arrangement makes it possible to avoid such inconvenience of the grain amount reaching the target storage amount MI immediately after entry into the next reaping path and having to reversely travel the traveling vehicle body. The arrangement makes it possible to avoid another inconvenience of an amount of grains exceeding the target storage amount MI being harvested erroneously, thus being unable to be charged to the receiving destination drier C1.

[Inhibition Flag for Second Determination]

Once grains have been discharged from the grain tank 6, the flag monitoring section 31 (see FIG. 4) will set the inhibition flag for inhibiting the second determination U2. When this inhibition flag is set, an operation of the determination switch 9 is disabled, so that the second determination U2 will not be initiated even if the determination switch 9 is operated. When the flag monitoring section 31 (see FIG. 4) releases the inhibition flag setting, an operation of the determination switch 9 is enabled, thus allowing initiation of the second determination U2. This inhibition flag setting is arranged to be released when the cumulative reaping traveling distance after initiation of the work again exceeds a set distance (e.g. 10 meters).

Figure 8:
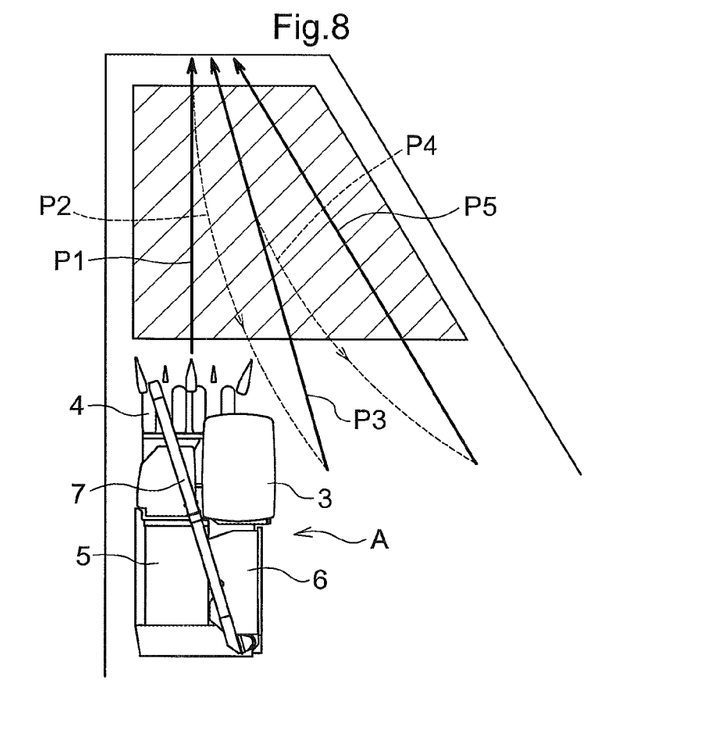
FIG. 8 is a diagram as seen in a plan view for explaining release of an inhibition flag for inhibiting a second determination.

Specifically, as illustrated in FIG. 8 for instance, a relatively small un-reaped (un-worked) area may remain at e.g. a corner portion of the field, so a harvest work will be carried out with repetition of reaping traveling rounds (forward traveling) P1, P3, P5 and non-reaping traveling rounds (reverse traveling) P2, P4. Incidentally, whether the traveling state of the traveling vehicle body is a reaping traveling state or a non-reaping traveling state is detected by the traveling state detection section 24 (see FIG. 4). In such case as above, even if a distance of each single reaping traveling round P1, P3, P5 falls short of a set distance, if a sum total of the distances of the reaping traveling rounds P1, P3, P5 exceeds the set distance, the inhibition flag will be released, thus enabling implementation of the second determination U2.

According to one such arrangement known from the conventional art, the inhibition flag would be released from its setting if a distance of one continuous reaping traveling round after initiation of a work exceeds a set distance. However, with this conventional arrangement, there was possibility that release of the setting of the inhibition flag would hardly take place, thus resulting in inadvertent continuation of disabling of the second determination in case a reaping work is carried out in a relatively small area as described above. On the other hand, in the case of the present embodiment, as described above, release of the inhibition flag setting is triggered by the set distance being exceeded by the cumulative distance of reaping traveling rounds after work initiation. Thus, the occurrence of the above-described inconveniences can be avoided.

OTHER EMBODIMENTS

Next, other embodiments which partly modify the foregoing embodiment will be explained. Here, it is understood that the foregoing embodiment and the respective other embodiments can be selectively used in any desired combination as long as no contradiction results from such combination. Incidentally, the scope of the present invention is not limited by the contents of the respective embodiments disclosed herein.

(1) In the foregoing embodiment, there was shown an arrangement in which the preliminary informing T2 is effected. However, the invention is not limited thereto, but the preliminary informing T2 may not be effected.

(2) In the foregoing embodiment, there was shown an arrangement in which the entry warning informing T4 is effected. However, the invention is not limited thereto, but the entry warning informing T4 may not be effected. Further, in place of such entry warning informing T4, it is possible, for instance, to arrange such that the reaping clutch 14 and the threshing clutch 15 are switched to the disengaging state respectively if the grain culm sensor 13 for detecting grain culms at the reaping section 4 becomes non-detecting state when the total harvest amount is present between the target storage amount MI and the preliminary target amount MP. Still alternatively, it is possible to arrange such that the entry warning informing T4 is effected AND the reaping clutch 14 and the threshing clutch 15 are switched to the disengaging state respectively if the grain culm sensor 13 for detecting grain culms at the reaping section 4 becomes non-detecting state when the total harvest amount is present between the target storage amount MI and the preliminary target amount MP.

(3) In the foregoing embodiment, there was shown an arrangement in which the respective functional sections, the traveling state detection section 24, the drying requesting section 25, the setting section 26, the comparison section 27, the harvest amount determination section 28, the calculation section 29, the decision section 30, the flag monitoring section 31, the display control section 32, the informing section 33 and so on are included in the control system on the side of the traveling vehicle body of the combine A. However, the invention is not limited thereto, but these respective functional sections may be included in the mobile communication terminal 20 to be incorporated in the control system of the combine A. In this case, the respective functional sections can be realized by an application program(s) to be installed in the mobile communication terminal 20. Further alternatively, the respective functional sections may be included in appropriate distribution on the side of the traveling vehicle body of the combine A, the side of the mobile communication terminal 20 of the combine A and the side of the server 41 of the management center G.

(4) In the foregoing embodiment, there was shown an arrangement in which the harvest management system includes a plurality of combines A and a plurality of drying facilities C. However, the invention is not limited thereto. Alternatively, the harvest management system may include only one combine A or the harvest management system may include only one drying facility C. Further, there was shown an arrangement in which the drying facility C includes a plurality of driers C1. However, the invention is not limited thereto. Alternatively, the drying facility C may include only one drier C1.

(5) In the foregoing embodiment, there was shown an arrangement in which the control system of the combine A incorporates the mobile communication terminal 20. However, the invention is not limited thereto. Alternatively, the control system of the combine A may not incorporate the mobile communication terminal 20. In this case, the control system on the traveling vehicle body side of the combine A will include a communication terminal configured as a stationary type computer having the function of the long-range communication section 35 as what is referred to herein as the "communication section".

(6) In the foregoing embodiment, there was shown an arrangement in which the combine A effects data transmission/reception to/from each drier C1 of the drying facility C via the management center G. However, the invention is not limited thereto. Alternatively, the combine A may effect data transmission/reception to/from each drier C1 of the drying facility C not via, i.e. with bypassing, the management center G.

(7) In the foregoing embodiment, there was shown an arrangement in which fullness of the grain tank 6 is detected by the full sensor 11 and the full informing T1 is effected. However, the invention is not limited thereto. Alternatively, with elimination of the full sensor 11, the full informing T1 may be effected when the first determination amount M1 has exceeded a full threshold value. In this case, such full threshold value can be set as any value (e.g. a nearly full value slightly smaller than a mechanical fullness) according to the preference of the worker.

(8) In the foregoing embodiment, the grain tank 6 was cited as an example of the "grain storage section". However, the invention is not limited thereto. Alternatively, it may be any other "grain storage section" such as a grain hopper for packing and collecting grains. In this case, as the "harvest amount sensor", e.g. a balance capable of measuring the weight of the grain bag or the like can be employed.

(9) In the foregoing embodiment, the load cell 8 capable of determining the weight of grains stored in the grain tank 6 was cited as an example of the "harvest amount sensor". However, the invention is not limited thereto. Alternatively, for example, instead of the load cell 8, it is possible to provide a level sensor capable of determining a storage volume of grains stored in the grain tank 6 as the "harvest amount sensor".

(10) In the foregoing embodiment, there was shown an arrangement in which whether the state is a reaping traveling state or a non-reaping traveling state is detected based on a state of the grain culm sensor 13, a state of the threshing clutch 15 and detection result of the vehicle speed sensor 12. However, the invention is not limited thereto. Alternatively, decision conditions used in the detection of whether the state is a reaping traveling state or a non-reaping traveling state may be different from the above.

INDUSTRIAL APPLICABILITY

The present invention is applicable not only to the above-described self propelling type combine, but also to a standard type combine for threshing whole culms of cut grain culms, etc.

DESCRIPTION OF REFERENCE MARKS/NUMERALS

4: reaping section
6: grain tank (grain storage section)
8: load cell (harvest amount sensor)
13: grain culm sensor
14: reaping clutch
15: threshing clutch
26: setting section
29: calculation section
30: decision section
33: informing section
35: long-range communication section (communication section)
  A: combine
  C1: drier
  M1: first determination amount
  M2: second determination amount
  MI: target storage amount
  MP: preliminary target amount
  T2: preliminary informing
  T3: completion informing
  T4: entry warning informing
  U1: first determination
  U2: second determination

The invention claimed is:

1. A combine for harvesting grain based on determining a grain storage amount, the combine comprising:
  a harvest amount sensor capable of determining the grain storage amount of grains stored in a grain storage section;
  a communication section of a control device, the communication section being capable of communication with an external drier;
  a setting section capable of setting a target storage amount based on a requested grain amount requested by the drier;
  a calculation section of the control device, the calculation section being capable of calculating a total harvest amount based on the grain storage amount determined by the harvest amount sensor;
  the harvest amount sensor being capable of a first determination for determining the grain storage amount intermittently during reaping traveling of a traveling vehicle body and a second determination for determining the grain storage amount based on a manual operation during stopped state of the traveling vehicle body;
  the calculation section being configured to calculate the total harvest amount based on a first determination amount by the first determination and a second determination amount by the second determination;
  a decision section of the control device, the decision section being capable of deciding whether the total harvest amount has exceeded the target storage amount or not; and
  an informing section of the control device, the informing section being capable of effecting completion informing if the decision section decides that the total harvest amount has exceeded the target storage amount.

2. The combine of claim 1, wherein:
  the setting section can set a preliminary target amount which is less than the target storage amount;
  a preliminary informing different from the completion informing is effected when the total harvest amount exceeds the preliminary target amount.

3. The combine of claim 2, wherein informing different from both the completion information and the preliminary informing is effected if a grain culm sensor for detecting grain culm at a reaping section becomes non-detection state when the total harvest amount is present between the target storage amount and the preliminary target amount.

4. The combine of claim 2, wherein:
  the combine further comprises:
    a reaping clutch for engaging/disengaging power transmission to a reaping section; and
    a threshing clutch for engaging/disengaging power transmission to a threshing device; and
  wherein the reaping clutch and the threshing clutch are brought into disengaging state respectively if a grain culm sensor for detecting grain culm at the reaping section becomes non-detection state when the total harvest amount is present between the target storage amount and the preliminary target amount.

* * * * *